(12) United States Patent
Su et al.

(10) Patent No.: US 10,804,995 B2
(45) Date of Patent: Oct. 13, 2020

(54) RADIO FREQUENCY CHAIN ALLOCATION METHOD AND RADIO NODE DEVICE

(71) Applicants: HON HAI PRECISION INDUSTRY CO., LTD., New Taipei (TW); NATIONAL TAIWAN UNIVERSITY, Taipei (TW)

(72) Inventors: Hsuan-Jung Su, Taipei (TW); Chen-Chieh Hong, Taipei (TW); Chien-Hung Chen, Kaohsiung (TW)

(73) Assignees: HON HAI PRECISION INDUSTRY CO., LTD., New Taipei (TW); NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 16/274,441

(22) Filed: Feb. 13, 2019

(65) Prior Publication Data

US 2019/0253123 A1 Aug. 15, 2019

Related U.S. Application Data

(60) Provisional application No. 62/630,467, filed on Feb. 14, 2018.

(51) Int. Cl.
*H04B 7/06* (2006.01)
*H04B 7/08* (2006.01)
*H04B 7/0413* (2017.01)

(52) U.S. Cl.
CPC ........ *H04B 7/0686* (2013.01); *H04B 7/0413* (2013.01); *H04B 7/0617* (2013.01); *H04B 7/0857* (2013.01); *H04B 7/0868* (2013.01)

(58) Field of Classification Search
CPC .. H04B 7/0413; H04B 7/0456; H04B 7/0617; H04B 7/0686; H04B 7/0857; H04B 7/0868
See application file for complete search history.

(56) References Cited

U.S. PATENT DOCUMENTS

| | | | | |
|---|---|---|---|---|
| 2011/0019759 A1* | 1/2011 | Stager | ................. | H04B 7/0617 375/267 |
| 2016/0359661 A1* | 12/2016 | Chhabra | .............. | H04B 7/0413 |
| 2018/0192428 A1* | 7/2018 | Doostnejad | ......... | H04B 7/0632 |
| 2018/0309494 A1* | 10/2018 | Zhu | ...................... | H04B 7/0617 |

* cited by examiner

*Primary Examiner* — David B Lugo
(74) *Attorney, Agent, or Firm* — ScienBiziP, P.C.

(57) ABSTRACT

A method for radio frequency chain allocation. The method is utilized in a massive multiple-input multiple-output (MIMO) system. Specifically, a hybrid beamforming (HB) system in which the overall beamformer consists of a low-dimensional digital beamformer followed by an analog beamformer utilized the method to allocate RF chains to data streams. The total number of RF chains is not necessarily equal to the number of data streams to users.

8 Claims, 10 Drawing Sheets

RADIO FREQUENCY CHAIN ALLOCATION METHOD AND RADIO NODE DEVICE

CROSS-REFERENCE TO RELATED APPLICATIONS

This application claims the benefit of U.S. Provisional Application No. 62/630,467 filed on Feb. 14, 2018, and entitled "RF Chain Allocation and Related Processing for Massive MIMO Systems", which is incorporated herein by reference in its entirety.

BACKGROUND

1. Technical Field

The disclosure relates to wireless communication techniques, and more particularly to radio frequency (RF) chain allocation for massive multiple input and multiple output (MIMO) systems.

2. Description of Related Art

For the next generation communication networks, millimeter wave (mmWave) technology is considered one of the promising candidates to address the challenge of bandwidth shortage. Massive multiple-input multiple-output (MIMO) also evolves with mmWave communications and leads to the development of hybrid beamforming (HB), where analog processing of RF signals, referred to as analog beamforming, is combined with digital processing, referred to as digital beamforming, in the baseband to improve the performance with a limited number of RF chains.

DETAILED DESCRIPTION

Regarding notation in the detailed description, real part and imaginary part of a complex scalar a are denoted by Re{a} and Im{a} respectively. For a matrix A, $\mathrm{Tr}(A)$, $A^T$ and $A^H$ denote the trace, transpose and Hermitian operations respectively. The notation $\|\cdot\|_F$ denotes the Frobenius norm, which is defined as $\|A\|_F = \sqrt{\mathrm{Tr}(AA^H)}$. Notation $A_s^{-1}$ and $|A|$ are the inverse and determinant of a square matrix $A_s$ respectively. Notation $I_n$ denotes the identity matrix of dimension n. A diagonal matrix is denoted diag{ ... } whose kth parameter is the kth diagonal term in the matrix. Notation $E[\cdot]$ denotes the expectation operator.

The method for RF chain allocation is utilized in a massive multiple-input multiple-output (MIMO) system. Specifically, a hybrid beamforming (HB) system in which the overall beamformer consists of a low-dimensional digital beamformer followed by an analog beamformer utilized the method to allocate RF chains to data streams. Due to power and complexity consideration, analog beamforming, also referred to as analog precoding, is typically implemented using phase shifters and the elements of a analog precoder have the constraint of constant magnitude. The method of the disclosure may be applied to downlink multiuser MIMO (MU-MIMO) transmission using HB, or point-to-point (P2P) MIMO communication.

Figure 1:
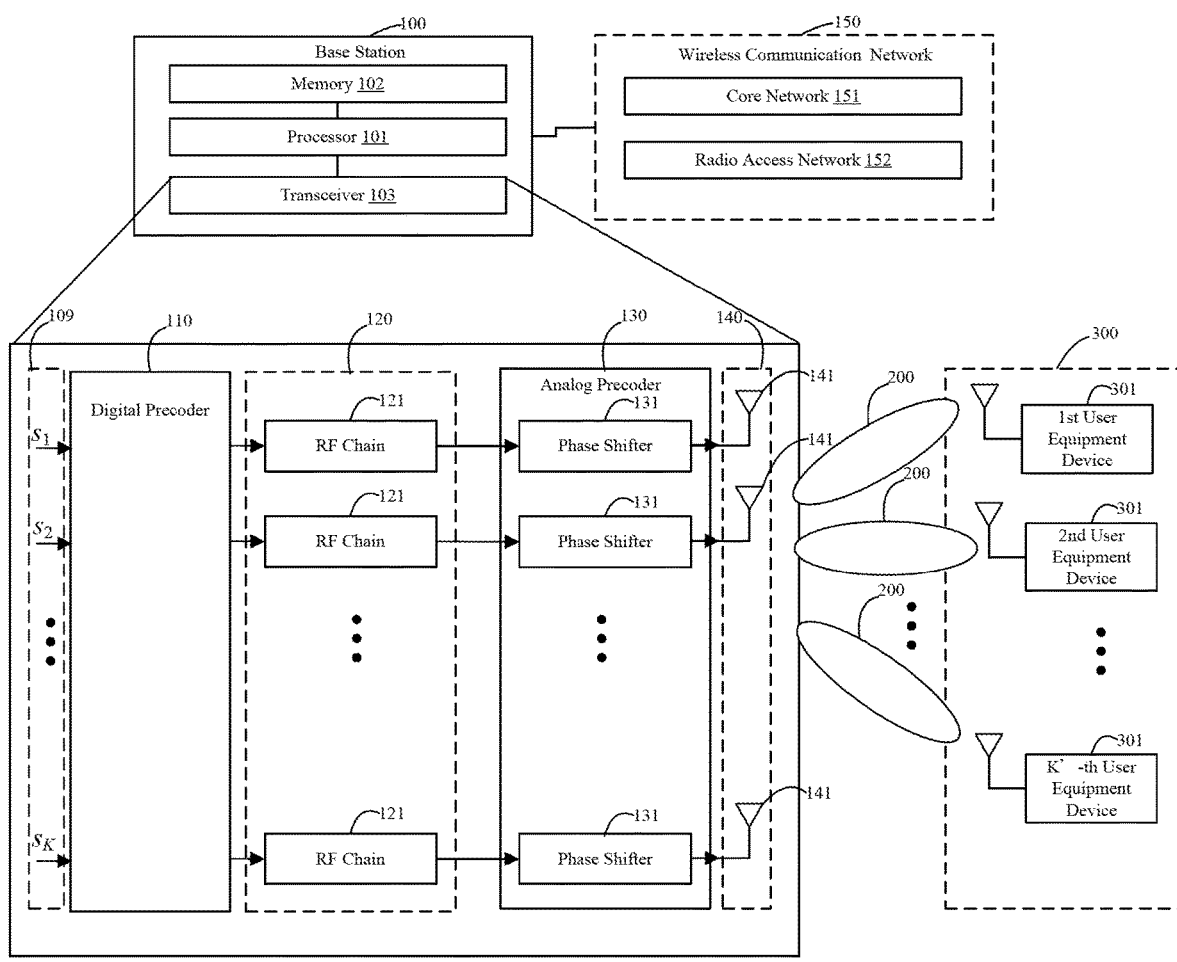
FIG. 1 shows a block diagram of an embodiment of a base station of the disclosure.

With reference to FIG. 1, a base station (BS) 100 is radio node device in a wireless communication network and includes a processor 101, a memory 102, and a transceiver 103. Embodiments of the base station 100 may include a NodeB, an evolved NodeB (eNB), or a gNodeB (gNB). The wireless communication network 150 may include a radio access network (RAN) 152 and a core network 151 based on 3rd Generation Partnership Project (3GPP) Long Term Evolution (LTE) and evolved packet core (EPC), or 3GPP new radio (NR) access network and 3GPP next generation core network.

The processor 101 transmits downlink signals to a user equipment (UE) device and receives uplink signals from the UE device via the transceiver 103. The transceiver 103 receives and transmits data under the control of the processor 101. Embodiments of the processor 101 may include one or more application specific integrated circuits (ASICs), digital signal processors (DSPs), digital signal processing devices (DSPDs), programmable logic devices (PLDs), field programmable gate arrays (FPGAs), central processing units (CPUs), controllers, microcontrollers, microprocessors, graphics processing units (GPUs), and others.

The method of the disclosure may be implemented by computer program stored in storage media, such mass storage in the base station 100. When the computer program implementing the method is loaded to a memory 102 by a processor 101, the processor 101 in the device 100 executes the disclosed method.

Embodiments of UE device may include a personal digital assistant (PDA), a cellular phone, a personal communication service (PCS) phone, a global system for mobile (GSM) phone, a wideband code division multiple access (WCDMA) phone, an LTE phone, a NR phone, a Mobile broadband system (MBS) phone, a hand-held PC, a laptop PC, a smart phone, a multi mode-multi band (MM-MB) terminal, etc.

The transceiver 103 is a multiple-input and multiple-output (MIMO) antenna array system. In FIG. 1, the processor 101 provides K downlink data streams $S_1, S_2, \ldots S_K$ as input signal 109 to transceiver 103 which performs beamforming processing on the input signal 109 to generate beams 200 and transmit the data streams $S_1, S_2, \ldots S_K$ through the beams 200 to UE devices 301 in coverage area 300. The transceiver 103 includes a plurality of digital precoders in a digital precoder stage 110, a plurality of RF chains 121 in an RF chain stage 120, and a plurality of phase shifters 131 serving as analog precoders in an analog precoder stage 130. Each of the phase shifters 131 is connected to an antenna 141 in an antenna array 140. An RF chain may include a signal transmission path and a signal receiving path. The signal transmission path may include at least one of the following components: one or more signal mixers, one or more power amplifiers, and one or more up converters. The signal receiving path may include at least one of the following components: one or more signal mixers, one or more low noise amplifiers, and one or more down converters.

A user equipment (UE) device 301 has a single antenna. A UE device has multiple antennas may be treated as multiple virtual UE device each having a single antenna and sharing channel information with one another. Allocating the RF chains to UE devices or, more generally, the signal space dimensions of the UE devices, and the related precoder designs are critical to the system performance.

In communication with the UE devices 301, the processor 101 receives UE identity, such as international mobile equipment identity (IMEI), of each of the UE device 301 from a core network such as the core network 151 in the wireless communication network 150. The processor 101 further receives service requirements associated with each of user equipment identities associated with the UE devices 301. The processor 101 may further receive signal requirements associated with each of user equipment identities associated with the UE devices 301. Each of the user equipment identities is associated with a subscriber identity, such as international mobile subscriber identity (IMSI), representing a user of a UE device 301.

A MIMO antenna array system executing the RF chain allocation method is given in the following. Consider a multiuser downlink scenario with K' UE devices. The base station 100 is equipped with N antennas and $N_t^{RF}$ transmit RF chains serving K' UE devices each equipped with M antennas and $N_r^{RF}$ chains. There are a total of K data streams to be transmitted by the base station 100 and each UE device demands d data streams. Thus, the total number of data streams served by the base station 100 is K=K'd. For simplicity, it is assumed that $M=N_r^{RF}=d=1$ and K'=K. Because the number of transmit RF chains is limited, the HB architecture is applied at the base station 100. Following the convention in the HB literature, beamforming at the base station 100 is performed by precoders. A case with $N_t^{RF}=K$ is shown in the following.

Figure 2:
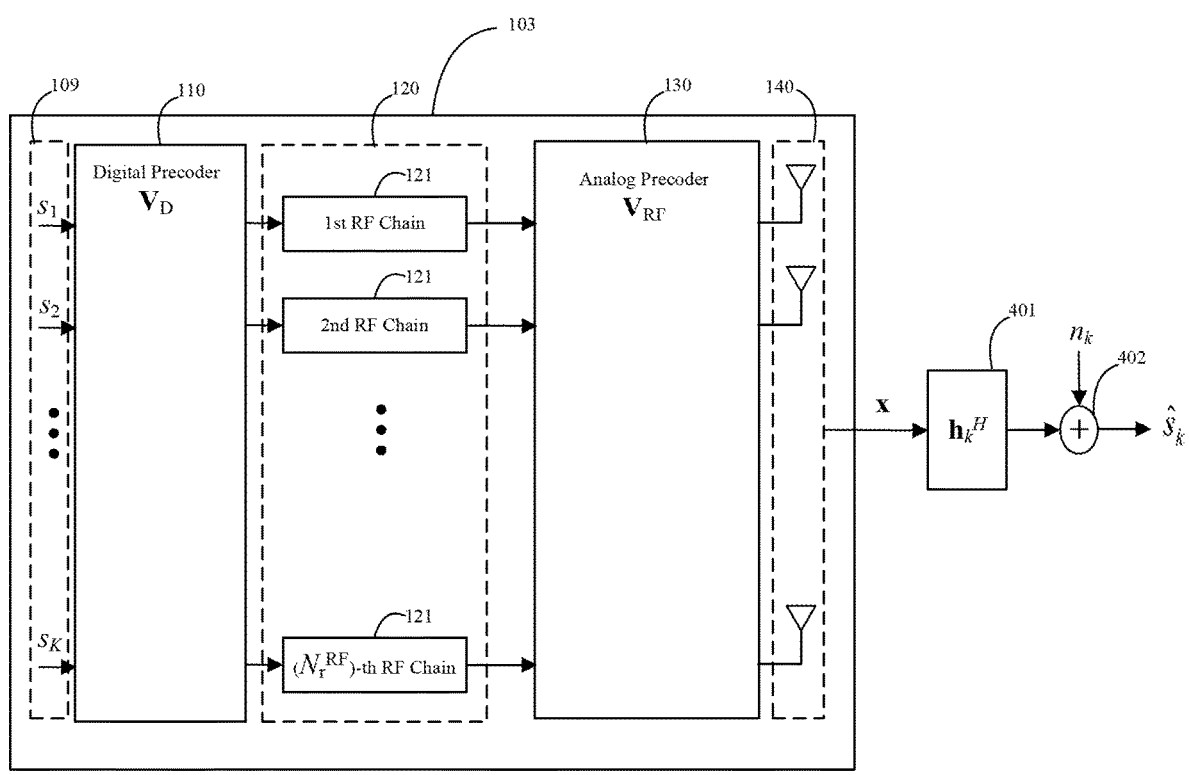
FIG. 2 shows a block diagram of a downlink system model for k-th UE device.

FIG. 2 shows a downlink system model for k-th UE device. For a given symbol time, the BS 100 first processes the data stream in baseband using a $N_t^{RF} \times N_s$ digital precoder, represented by matrix $V_D$. The digital precoder allocates power to the data streams and the power allocated can be characterized by a diagonal matrix as:

$$P = \mathrm{diag}\{p_1, p_2, \ldots, p_K\} \quad (1)$$

where $p_1, p_2, \ldots, p_K$ are the power allocated to the 1st, 2nd, ..., K-th data streams, respectively. The overall digital precoder can be represented as:

$$V_D = \tilde{V}_D P^{1/2} \quad (2)$$

where $\tilde{V}_D \in \mathbb{C}^{N_t^{RF} \times K}$ is the normalized digital precoder matrix (with the norm of each column being one).

The digitally precoded signals output by the digital precoder stage 110 are up-converted to the carrier frequency by the $N_t^{RF}$ RF chains 121 in stage 120. Then the BS 110 applies the $N \times N_t^{RF}$ analog precoders, represented by matrix $V_{RF}$, which is implemented by phase shifters 131 in the stage 130. The absolute value of each element of $V_{RF}$ is one. The transmitted signal x output by the analog precoder stage 130 can be represented as:

$$x = V_{RF} V_D s = \sum_{l=1}^{K} V_{RF} v_l^{(D)} s_l, \quad (3)$$

where $V_D = [v_1^{(D)}, v_2^{(D)}, \ldots, v_K^{(D)}]$, $s \in \mathbb{C}^{K \times 1}$ is the vector of data symbols for all UE devices, $s=[s_1, s_2, \ldots, s_K]^T$, and $x \in \mathbb{C}^{N \times 1}$ is the vector of transmitted signal. In FIG. 2, a multiplication operator for multiplying $h_k^H$ with x is shown as a block 401, and an addition operator for adding the output of the block 401 and $n_k$ is shown as a block 402. Provided that each data symbol $s_i$ is zero mean and uncorrelated with any other symbol $s_j$, $\forall i \neq i$. For k-th UE device which, in this example, receives the k-th data stream, the received signal is:

$$\begin{aligned} y_k &= h_k^H V_{RF} V_D s + n_k \\ &= h_k^H V_{RF} v_k^{(D)} s_k + h_k^H \left( \sum_{\substack{l=1 \\ l \neq k}}^{K} V_{RF} v_l^{(D)} s_l \right) + n_k, \end{aligned} \quad (4)$$

where the first term denote the desired signal, the second term is the inter-user interference, and $n_k$ represents the zero-mean additive Gaussian noise (AWGN) with variance $N_0$. Different metrics may be used to evaluate the performance of a HB system. For example, a sum rate can be expressed as:

$$R = \sum_{l=1}^{K} \log(1 + SINR_k) \quad (5)$$

where signal-to-interference-plus-noise (SINR) of k-th UE device may be represented $$SINR_k = \frac{|h_k^H V_{RF} v_k^{(D)}|^2}{\sum_{\substack{l=1 \\ l \neq k}}^{K} |h_k^H V_{RF} v_l^{(D)}|^2 + N_0} \quad (6)$$

In the following, maximizing sum rate is taken as an example of the signal requirements. Similar procedures can be applied if other performance metrics are considered. The optimal analog and digital precoders to maximize the sum rate under the total power constraint should satisfy:

$$\max_{V_D, V_{RF}} R, \quad (7)$$

$$\text{subj. to } Tr(V_{RF} V_D V_D^H V_{RF}^H) \leq P$$

where P is the total power constraint at the BS 100.

In general, no closed form solution may be obtained for the optimal hybrid precoders. The following steps are to approximate the optimal solution.

Step 1: Design the analog precoders assuming that the digital precoder stage 110 is doing nothing, i.e., digital precoder input equals digital precoder output, with equal power allocation, that is, $$\check{V}_D^0 = I_K \text{ and } P = \frac{P}{K}I_K$$

Find the optimal analog precoders.

Step 2: Design the digital precoder in the stage 110 for the effective channel formed by combing the effects of the downlink channel and the analog precoders found in Step 1.

Figure 3:
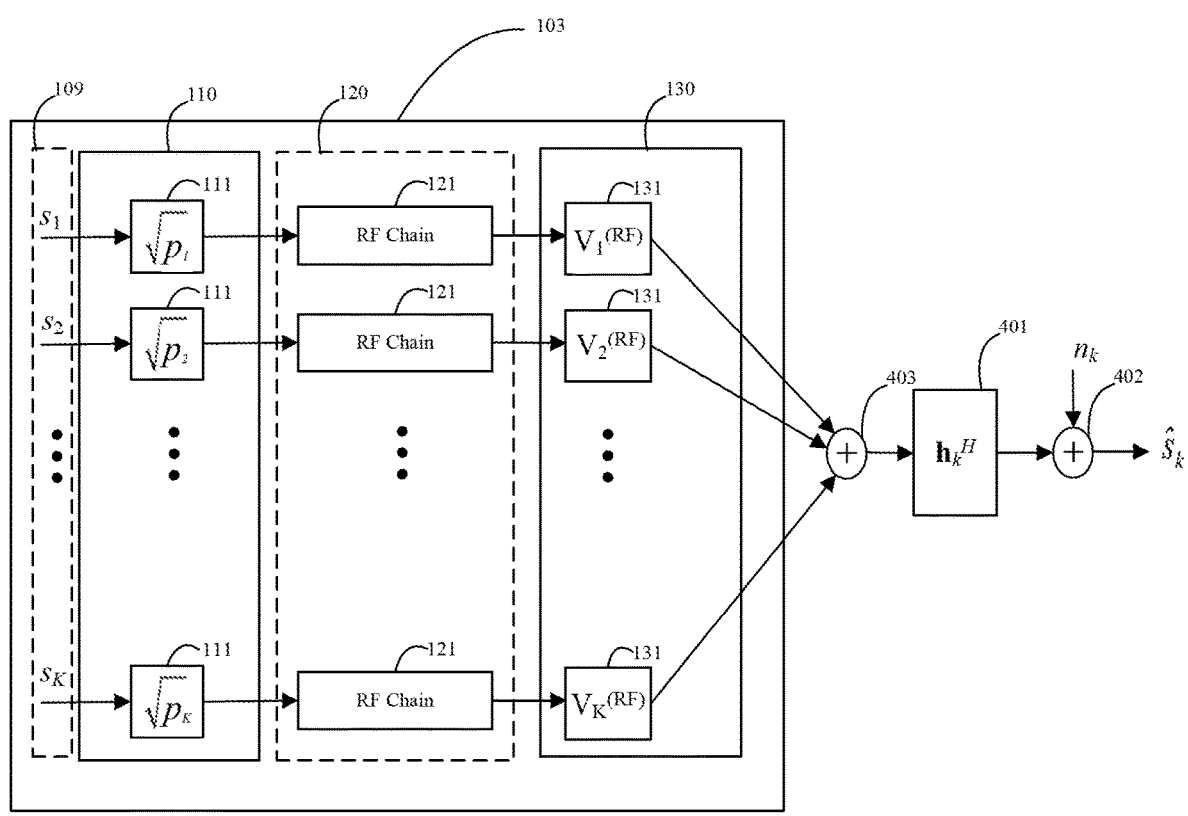
FIG. 3 shows a block diagram of another downlink system model for k-th UE device.

Mathematical description of the precoder design problem is described in the following. In analog precoder design (Step 1), provided $$\check{V}_D^0 = I_K \text{ and } P = \frac{P}{K}I_K$$

in digital precoders in stage 110. Thus the system model can be shown as FIG. 3 and the signal received by k-th UE device can be represented as:

$$y_k = h_k^H V_{RF}s + n_k \quad (8)$$
$$= h_k^H v_k^{(RF)} s_k + h_k^H \left( \sum_{\substack{l=1 \\ l \neq k}}^{K} v_l^{(RF)} s_l \right) + n_k,$$

where $V_{RF} = [v_1^{(RF)}, v_2^{(RF)}, \ldots, v_K^{(RF)}]$ and the matrix $v_i^{(RF)}$ represents the analog precoder for i-th data stream and i-th UE device. FIG. 3, an addition operator for adding the output of the analog precoder stage 130 is shown as a block 403.

Figure 4:
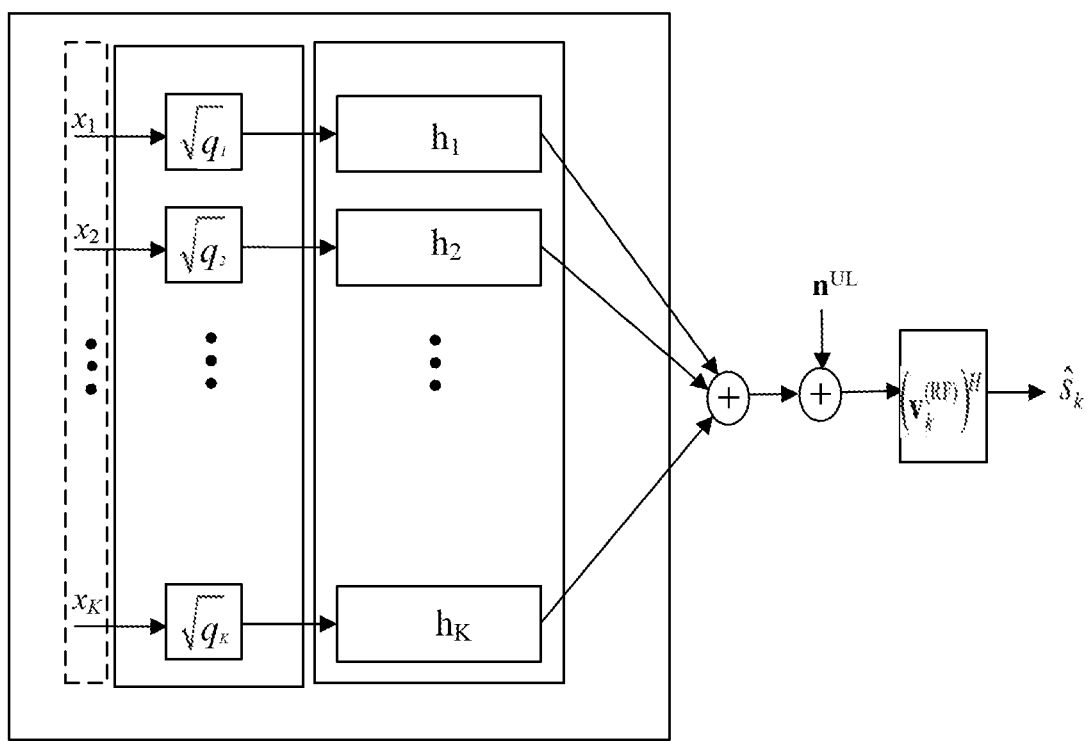
FIG. 4 shows a block diagram of a virtual uplink system model of k-th data stream for k-th UE device.

Since difficult may be to find the optimal analog precoder in the original downlink system, uplink-downlink duality is often applied and help to solve transmit beamforming/precoding. FIG. 4 shows a virtual uplink model of k-th data stream for k-th UE device. In solving the analog precoder, the digital precoder is fixed as stated above. Using the virtual uplink model, the received signal for UE device (data stream) k can be written as:

$$\check{s}_k = (v_k^{(RF)})^H \left( \sum_{i=1}^{K} h_i^H \sqrt{q_i} \, x_i + n^{UL} \right), \quad (9)$$

where $q_i$ is the power for UE device i and $n^{UL}$ is the effective noise in the virtual uplink.

Problem of Analog Precoder Design

From equation (9), the SINR of the k-th data stream received by the k-th UE device is:

$$SINR_k^{(RF)} = \frac{(v_k^{(RF)})^H (q_k h_k h_k^H) v_k^{(RF)}}{(v_k^{(RF)})^H \left( \sum_{\substack{i=1 \\ i \neq k}}^{K} q_i h_i h_i^H + n^{UL}(n^{UL})^H \right) v_k^{(RF)}}, \quad (10)$$

The following problem formulation (P1) targets at maximizing the SINR of the k-th data stream received by the k-th UE device.

Problem 1 (P1):

Provided $N_t^{RF} = K$ and equal power allocation in the analog precoder stage 130, i.e., $$q_i = \frac{P}{K}, \forall i,$$

where P is the total power at the BS 100. With the constant-magnitude constraint of the phase shifters, maximizing the SINR in equation (10) of the k-th data stream received by the k-th UE device over all analog precoders $v_k^{(RF)}$ can be formulated as:

$$\max_{v_k^{(RF)}} SINR_k^{(RF)}, \text{ subj. to } |v_k^{(RF)}(l)| = 1 |\forall k, l. \quad (11)$$

Unfortunately, the constant-magnitude constraint of the phase shifters makes the problem non-convex. To provide a near-optimal solution to the P1, the original problem is divided into two sub-problems. The strategy is to relax the constraint of constant-magnitude and try to solve the un-constrained optimization problem first. Then a solution which satisfies the constant-magnitude constraint and can approach the optimal solution can be found. The un-constrained optimization problem is referred to as Problem 1 relax in the following.

Problem 1 Relax (P1 r):

Assume $N_t^{RF} = K$ and equal power allocation in analog precoder stage 130, i.e., $$q_i = \frac{P}{K}, \forall i$$

where P is the total power at the BS 100. Maximize the SINK in equation (10) for the k-th data stream received by the k-th UE device over all analog precoders $v_k^{(RF)}$.

$$\max_{v_k^{(Fully)}} SINR_k^{(RF)}, \forall k \quad (12)$$

Here $v_k^{(Fully)}$ represents the analog precoders without the constant-magnitude constraint which is equivalent to the fully digital precoder.

After the optimal $v_k^{(Fully)}$ are found, the solution $v_k^{(RF)}$ that satisfies the constant-magnitude constraint and can approach the optimal solution is obtained by Problem 1 approach as follows.

Problem 1 Approach (P1 a):

Assume $N_t^{RF} = K$. Minimize the difference between the optimal solution found in P1 r for all UE devices and the target analog precoder $V_{RF}$ which satisfies the constant-magnitude constraint.

$$\min_{V_{RF}} \|V_{RF} - V_{Fully}\|_F^2, \text{ subj. to } |V_{(RF)}(i, j)| = 1 |\forall i, j. \quad (13)$$

where $V_{RF} = \{v_i^{(RF)}\}_{i=1}^K$, $V_{Fully} = \{v_i^{(Fully)}\}_{i=1}^K$. Here Euclidean distance is utilized as the performance metric, so the Frobenius norm is used in P1 a.

As to the problem of digital precoder design, due to the constant-magnitude constraint and the finite resolution of phase shifters, the constrained solution found above may not yield the optimal performance. These hardware impairments may be compensated by the baseband digital precoder design. The case of $N_t^{RF}<K$ is to be discussed later. ZF approach may fail, and only the approaches that can tolerate interference, such as to maximize the SINR, will work.

Situations of RF chain allocation and related analog precoder design are given in the following. No matter how many data streams there are to be served, the dimension of the signal space of the transmitted signal x is governed by the number of RF chains. Three situations are possible: the number of RF chains is less than the number of data streams, i.e., $N_t^{RF}<K$; the number of RF chains is equal to the number of data streams, i.e., $N_t^{RF}=K$; and the number of RF chains is larger than the number of data streams, i.e., $N_t^{RF}>K$. In the first case, the dimension of the transmitted signal space is not enough to separate the data streams, and there is no way to completely eliminate the interference between the data streams. Therefore, the design target should be to make the analog precoder match the channels between the BS 100 and the UE devices 301 as much as possible, such that the maximum power can be conveyed to the UE devices 301. In the second case, the dimension of the transmitted signal space equals the number of data streams. Ideally, the BS can allocate one RF chain to each data stream and design the precoder such that each UE device can receive its desired data stream with the interference from the other data streams suppressed. However, due to the constant magnitude constraint of phase shifters, the interference suppression cannot be done perfectly. In this case, the analog precoder can be designed to suppress the inter-beam interference and inter-stream interference as much as possible, or maximize the SINR of each data stream as much as possible, depending on the performance metrics used. In the third case, the number of RF chains is larger than the number of data streams. More than one RF chains can be allocated to each data stream to alleviate the effect of the constraint of the phase shifters and approach the optimal performance. Alternatively, more RF chains can be allocated to the dimensions (or directions) of the signal space that experience better channels to enhance the performance. The design issues of these three cases are detailed below.

Figure 5:
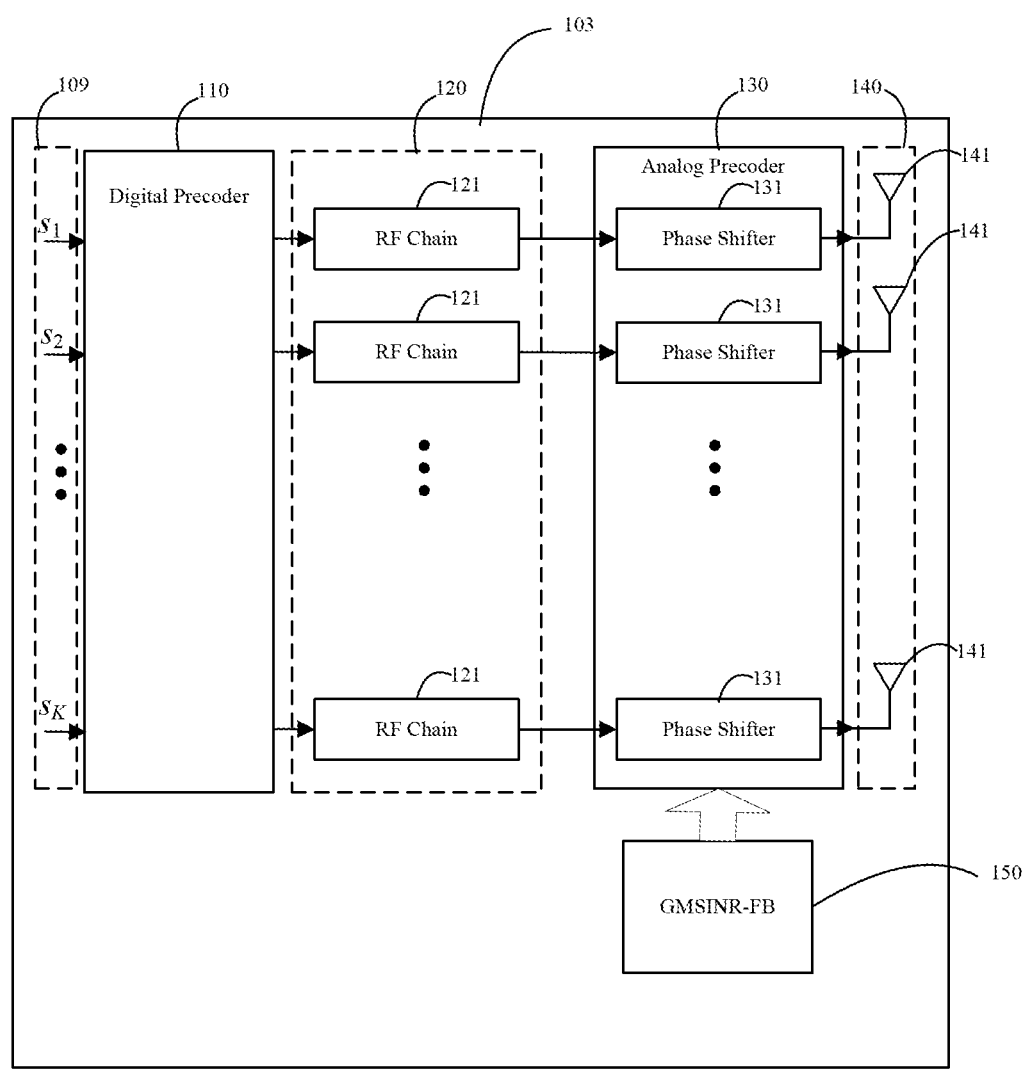
FIG. 5 shows a block diagram of a MIMO antenna array system when the number of RF chains is equal to the number of data streams.

Analog precoder design when $N_t^{RF}=K$ is given in the following. FIG. 5 shows a MIMO antenna array system when $N_t^{RF}=K$. As an example, a group maximum SINR filter bank (GMSINR-FB) 150 is utilized as the analog precoder in stage 130 which can achieve the optimal balance between interference suppression and noise enhancement. The constant-magnitude constraint of the phase shifters is first ignored in the derivation, then consider the effect of this constraint.

The GMSINR-FB is used as beamformers and processes the data streams of each UE device as a group. In the particular example, each group has only one data stream. Note that the approach can be easily generalized to the case in which each UE device has multiple data streams. Applying the GMSINR-FB as the analog precoder, the design problem of maximizing the received SINR of each group becomes:

$$\max_{v_i^{(Fully)}} v_i^{(Fully)H} R_{s,i}^{UL} v_i^{(Fully)} \text{ subj. to } v_i^{(Fully)H} R_{n,i}^{UL} v_i^{(Fully)} = 1, \quad (14)$$

where $$R_{s,i}^{UL} = q_i^{(RF)} h_i (h_i)^H \quad (15)$$

is the covariance matrix of the desired signal in the virtual uplink (as shown in FIG. 4) for i-th UE device, and $$R_{n,i}^{UL} \sum_{\substack{l=1 \\ l \neq i}}^{K} q_l^{(RF)} h_l (h_l)^H + n^{UL} (n^{UL})^H \quad (16)$$

is the covariance matrix of interference-plus-noise in the virtual uplink for i-th UE device. With the quadratic form in equation (14), the problem is equivalent to the following Lagrange multipliers:

$$\frac{\partial \left( v_i^{(Fully)H} R_{s,i}^{UL} v_i^{(Fully)} - \lambda v_i^{(Fully)H} R_{n,i}^{UL} v_i^{(Fully)} \right)}{\partial v_i^{(Fully)}} = 0, \quad (17)$$

The solution to the Lagrange multipliers is a generalized eigenvalue problem:

$$R_{s,i}^{UL} v_i^{(Fully)} = \lambda v_i R_{n,i}^{UL} v_i^{(Fully)}, \quad (18)$$

where eigenvalue $\lambda$ may be represented as $$\lambda = \frac{v_i^{(Fully)H} R_{s,i}^{UL} v_i^{(Fully)}}{v_i^{(Fully)H} R_{n,i}^{UL} v_i^{(Fully)}} = SINR_i^{(RF)}, \quad (19)$$

Consequently, the maximum SINR is the largest eigenvalue obtained from the generalized eigenvalue problem, and the analog precoder for the i-th data stream is the eigenvector corresponding to the largest eigenvalue:

$$V_i^{(Fully)} = eig^1(R_{s,i}^{UL}, R_{n,i}^{UL}), \quad (20)$$

where eig(A,B) is defined as a function that produces the eigenvector x corresponding to the largest eigenvalue $\lambda$ of the eigenvalue problem $Ax=\lambda Bx$.

An analog precoder with the phase shifter constraint is given in the following. In the above derivation of the analog precoder stage 130 that maximizes the SINR of each data stream, the constant-magnitude constraint of the phase shifters is not considered. In the following, a solution of the analog precoder stage 130 that satisfies the constraint and is "closest" to the un-constrained solution obtained above is described. While "closest" can be defined in many senses, such as with the shortest chordal distance. In the following example, Frobenius norm is used as the metric to define "closest". That is, "closest" means that the target solution of the analog precoder stage 130 is the one that satisfies the constant-magnitude constraint while its difference from the un-constrained solution obtained above has the smallest Frobenius norm. That is, the target analog precoder $V_{RF}$ must minimize the following:

$$\begin{aligned} \|V_{RF} - V_{Fully}\|_F^2 &= Tr((V_{RF} - V_{Fully})(V_{RF} - V_{Fully})^H) \quad (21) \\ &= Tr(V_{RF} V_{RF}^H) + Tr(V_{Fully} V_{Fully}^H) - \\ &\quad 2Tr(\text{Re}(V_{Fully} V_{RF}^H)) \\ &= NN^{RF} + Tr(V_{Fully} V_{Fully}^H) - \\ &\quad 2Tr(\text{Re}(V_{Fully} V_{RF}^H)), \end{aligned}$$

Since $Tr(\cdot)$ is a linear function, derivation of the equations (21) can be obtained. Observing last line of the equation (21), the first term is constant and the second term depends on the optimal solution. Only the last term depends on the target analog precoder $V_{RF}$ in stage 130. Thus the optimization problem P1 a can be transformed to maximizing the last term in the last line of the equation (21). When $V_{RF}$ has the same phase components as $V_{Fully}$, the last term can be maximized. Thus, the target analog precoder $V_{RF}$ in stage 130 can be obtained as:

$$V_{RF} = \exp\{j \arg(V_{Fully})\}, \quad (22)$$

where $\arg(\cdot)$ denotes the component-wise argument operator. In the following, the $v_k^{(RF)}$ and $v_k^{(Fully)}$ is referred to as the analog beamformer and fully digital beamformer, respectively, of the k-th data stream for the k-th UE device.

Figure 6:
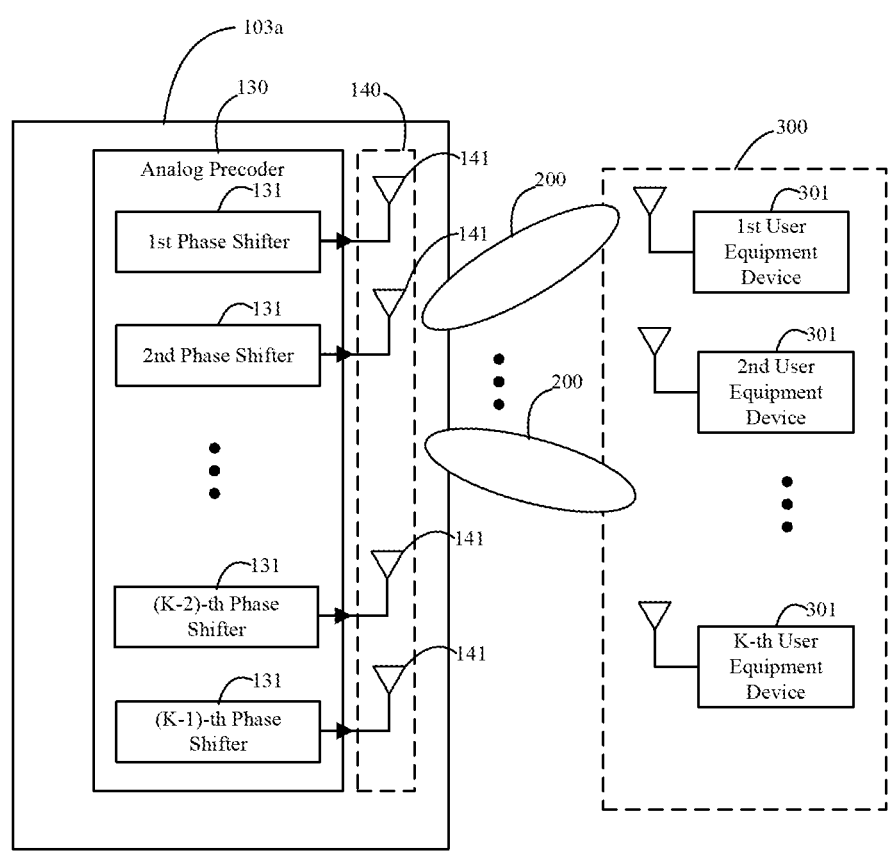
FIG. 6 shows a block diagram of an analog precoder design when the number of RF chains is less than the number of data streams.

An analog precoder design when $N_t^{RF} < K$ is given in the following. FIG. 6 shows an analog precoder design when $N_t^{RF} < K$. A MIMO antenna system 103a is an embodiment of the transceiver 103. If the priority of the data streams is already determined based on service requirements, such as the prices paid per subscriber, a sub-group of the $N_t^{RF}$ data streams with the highest priority may be selected to be served by the transceiver 103a. The maximum SINK design approach may be applied.

If no priority ranking of the data streams is determined, the RF chains 121 should be used to serve the signals for all UE devices 301 in the area 300 as much as possible. That is, the BS 100 is to support as much as possible the signal space spanned by the data streams of the UE devices 301. Note that in this case, the interference between the data streams may be suppressed by the baseband digital precoder. The unconstrained analog precoder $V_{Fully}$, which has $N_t^{RF}$ columns, should satisfy:

$$\max_{V_{Fully}} V_{Fully}^H R_s^{UL} V_{Fully}, \quad (23)$$

where $$R_s^{UL} = \sum_{l=1}^{K} q_l^{(RF)} h_l (h_l)^H \quad (24)$$

is the covariance matrix of the vector space spanned by the data streams of the UE devices 301. The solution of the equation (23) consists of the eigenvectors corresponding to the largest $N_t^{RF}$ eigenvalues of $R_s^{UL}$, that is, $$V_{Fully} = [v_1^{(Fully)}, v_2^{(Fully)}, \ldots, v_{N_t^{RF}}^{(Fully)}] = eig^{N_t^{RF}}(R_s^{UL}), \quad (25)$$

where $eig^n(A)$ is defined as a function that produces the eigenvectors x corresponding to the largest n eigenvalues $\lambda$ of the eigenvalue problem $Ax = \lambda x$. The analog precoder satisfying the constant-magnitude constraint may be found using equation (22).

An analog precoder design when $N_t^{RF} > K$ is given in the following. When $N_t^{RF} > K$, a subset of the RF chains 121 includes $N_t^{RF} - K$ RF chains. The processor 101 may initially not yet allocate $N_t^{RF} - K$ RF chains to serve data streams. Each of the $N_t^{RF} - K$ RF chains is referred to as an extra RF chain. An RF chain allocation method using extra RF chains, i.e., analog beams, is provided to enhance the system performance of the BS 100. In the following, two design approaches are proposed.

Figure 7:
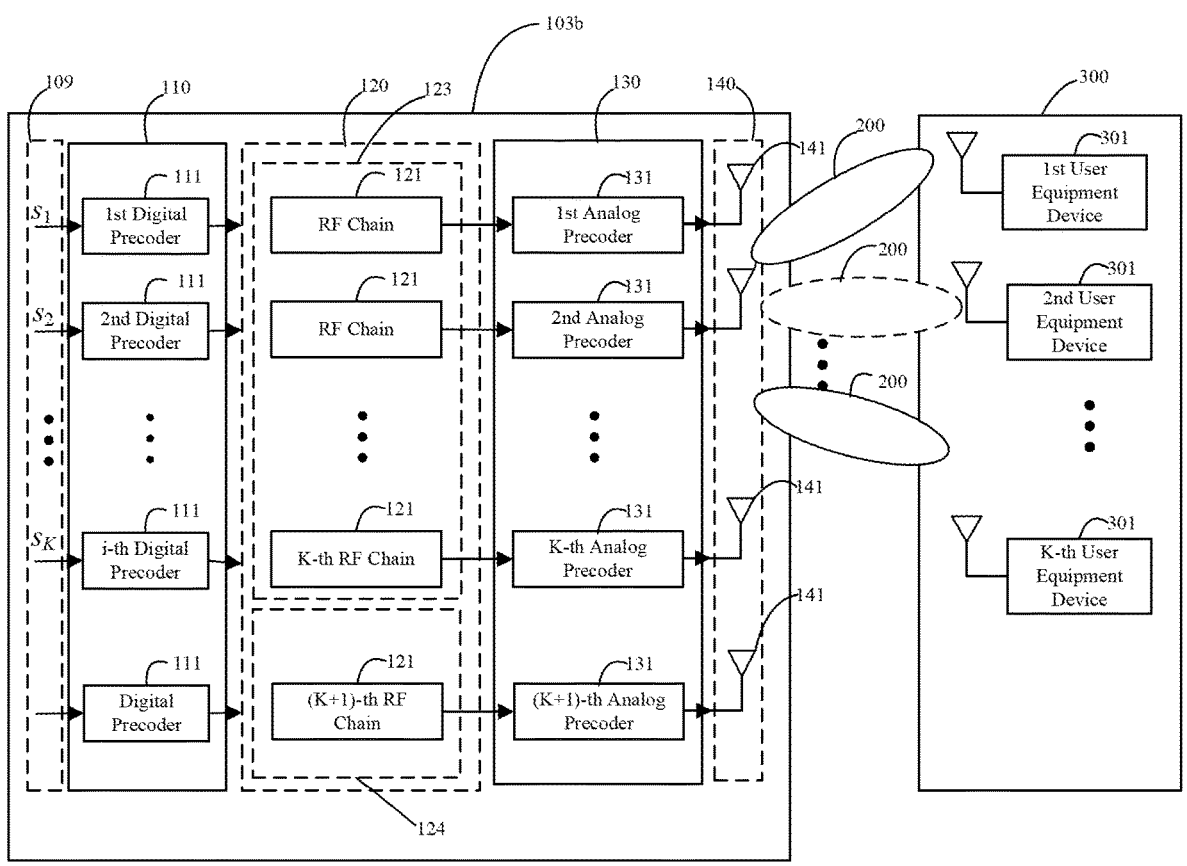
FIG. 7 shows a block diagram of a MIMO antenna system with a beam decomposition design.

Beam decomposition is detailed in the following. FIG. 7 shows a MIMO antenna system 103b as an embodiment of the transceiver 103 with a beam decomposition design. The system 103b has K+1 RF chains and K+1 analog beams, serving K data streams for K UE devices. To make sure that all data streams are processed such that the inter-stream interference is effectively suppressed, K RF chains will be used to process the K data streams, one for each, and form a first injective and surjective allocation relationship between the RF chains 121 and the data streams $S_1$, $S_2, \ldots S_K$. An extra RF chain may be used to further improve a data stream that has the highest priority. Similar, each of the extra RF chains may be used to further improve a data stream that has higher priority. The priority between data streams can be ranked according to the performance metric of service requirements and signal requirements. For example, when the revenue of the operator is concerned, the data stream belonging to the user who pays the most has the highest priority according to a service requirement. Alternatively, the data stream with the best channel condition has the highest priority according to a signal requirement such that the sum rate of the system can be increased the most.

In the following, a $1^{st}$ data stream for the $1^{st}$ UE device 301 is assumed to have the highest priority. Analog precoders serving other data streams that satisfy the constant-magnitude constraint are obtained by equations (20) and (22). Two RF chains are allocated to the $1^{st}$ data stream, with the corresponding constant-magnitude analog precoders obtained by the following decomposition. The analog beams formed by these two analog precoders allocated to the $1^{st}$ data stream is to be combined by the digital precoder in stage 110 to enhance the performance of data stream 1.

A beam decomposition approach for the RF chain allocation and beamforming is detailed in the following. A complex number can be decomposed into the sum of two numbers with constant magnitude. For example, a complex number $c = re^{j\alpha}$ with $0 \leq r \leq 2$ can be expressed as $c = e^{j\theta} + e^{j\phi}$, where:

$$\theta = \alpha + \cos^{-1}\left(\frac{r}{2}\right), \phi = \alpha - \cos^{-1}\left(\frac{r}{2}\right) \quad (26)$$

This $re^{j\alpha} = e^{j\phi}$ can be verified as follows:

$$e^{j\theta} + e^{j\phi} = \cos\left(\alpha + \cos^{-1}\left(\frac{r}{2}\right)\right) + j\sin\left(\alpha + \cos^{-1}\left(\frac{r}{2}\right)\right)nn + \quad (27)$$
$$\cos\left(\alpha - \cos^{-1}\left(\frac{r}{2}\right)\right) + j\sin\left(\alpha - \cos^{-1}\left(\frac{r}{2}\right)\right)$$
$$= r\cos\alpha + j(r\sin\alpha)$$
$$= re^{j\alpha}$$

In other words, with proper normalization, it is possible to use two phase shifters to represent any complex coefficient in a fully digital beam. Thus, a fully digital beamformer obtained by equation (20) can be decomposed into a sum of two analog beamformers satisfying the constant-magnitude constraint to avoid the performance loss due to the constraint. For example, the fully digital beamformer for i—the UE device can be decomposed as follows:

$$\begin{bmatrix} r_1 e^{j\alpha_1} \\ r_2 e^{j\alpha_2} \\ M \\ r_N e^{j\alpha_N} \end{bmatrix} = \begin{bmatrix} e^{j\theta_1} \\ e^{j\theta_2} \\ M \\ e^{j\theta_N} \end{bmatrix} + \begin{bmatrix} e^{j\phi_1} \\ e^{j\phi_2} \\ M \\ e^{j\phi_N} \end{bmatrix} \quad (28)$$

that is, $$v_i^{(Fully)} = v_{i1}^{(RF)} + v_{i2}^{(RF)} \quad (29)$$

where $v_i^{(Fully)}$ is the fully digital beamformer for i-th UE device obtained by equation (20) and $v_{i1}^{(RF)}$ and $V_{i2}^{(RF)}$ are the two analog beams decomposed from the fully digital beam. Variables i1 and i2 are the indices of the RF chains which support these two analog beams.

Based on the concept of decomposition, when $N_t^{RF} > K$, the extra RF chains may be allocated to the data streams according to priority ranking. For example, if the goal is to maximize the sum rate of the BS 100, the $SINR_k^{(RF)}$ for the k-the data stream, where k=1, ..., K, are calculated after the K analog precoders satisfying the constant-magnitude constraint are found according to equation (22). Then the $SINR_k^{(RF)}$ are ranked from high to low. The extra RF chains are allocated to the data streams according to the ranked $SINR_k^{(RF)}$. That is, after allocating one RF chain to each data stream, if still one or more extra RF chains have not been allocated, one of the extra RF chains is allocated to the data stream with the highest $SINR_k^{(RF)}$ among the data streams that are allocated only one RF chain. Similarly, another extra RF chain is allocated to the data stream with the second highest $SINR_k^{(RF)}$. This procedure is continued until all RF chains are allocated.

Figure 8:
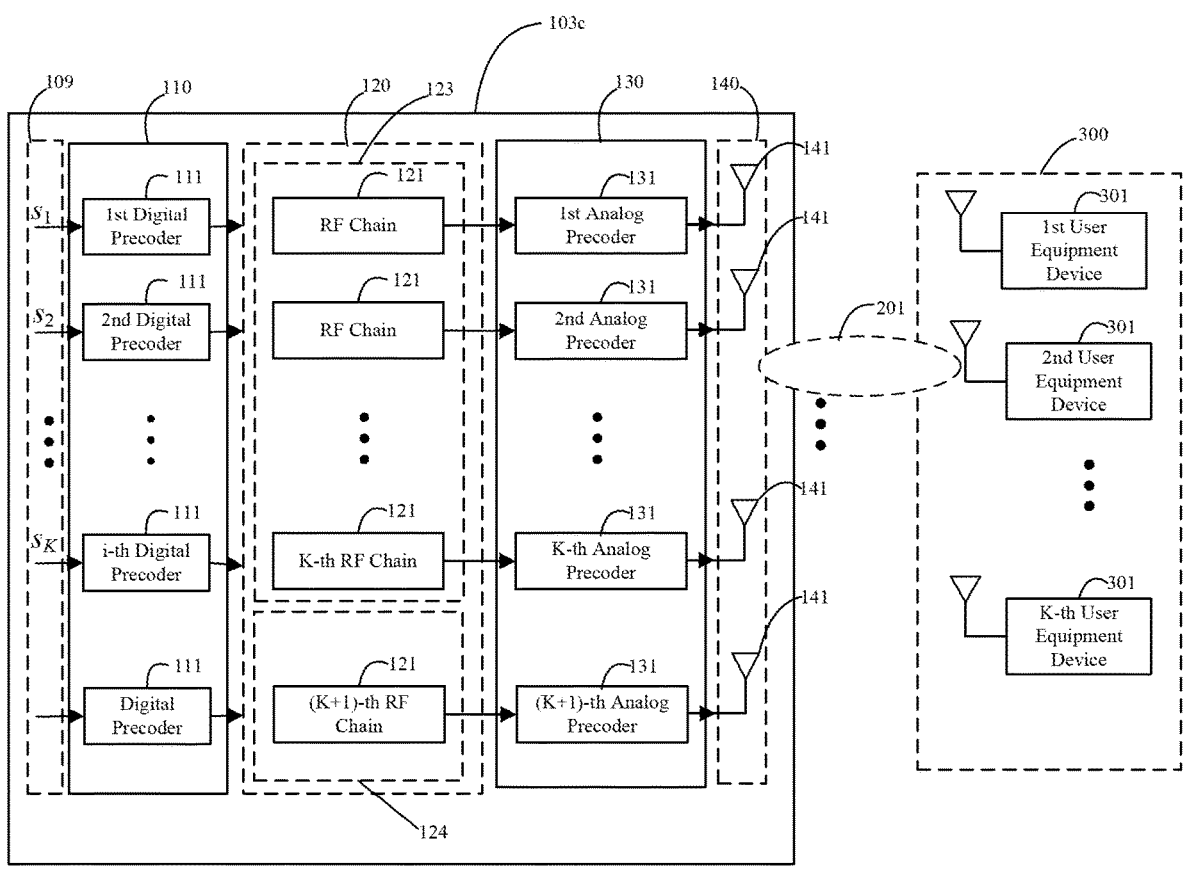
FIG. 8 shows a block diagram of a MIMO antenna system with an orthogonal space design.

An orthogonal space approach for the RF chain allocation and beamforming is detailed in the following. FIG. 8 shows a MIMO antenna system 103c as an embodiment of the transceiver 103 with an orthogonal space design. After allocating each data stream an RF chain with the constant-magnitude analog precoder obtained by equation (22), the processor 100 apply orthogonal projection to find the component in the unconstrained analog precoder (obtained by equation (20)) that is not covered by the constant-magnitude analog precoder. The orthogonal complement for data stream k is:

$$v_k^{(Oth)} = v_k^{(Fully)} - \frac{(v_k^{(RF)})^H v_k^{(Fully)}}{(v_k^{(RF)})^H v_k^{(RF)}} v_k^{(RF)}, \forall k \quad (30)$$

Then, depending on the priority ranking, the extra RF chains can be allocated to form beams 201 pointing to the directions of $v_k^{(Oth)}$'s (subject to the constant magnitude constraint by using equation (22)).

Alternatively, the $N_t^{RF} - K$ extra RF chains can be used to form beams 201 pointing to the $N_t^{RF} - K$ most significant dimensions (directions) of the orthogonal space of $V_{RF}$ which may be represented as:

$$V_{Oth} = [v'_1^{(Oth)} v'_2^{(Oth)} L v'_K^{(Oth)}] \quad (31)$$

where $$v'_k^{(Oth)} = v_k^{(Fully)} - V_{RF}(V_{RF}^H V_{RF})^{-1} V_{RF}^H v_k^{(Fully)}, \ldots , \forall k. \quad (32)$$

The $N_t^{RF} - K$ most significant dimensions of $V_{Oth}$ may be found by:

$$[v_{K+1} v_{K+2} L v_{N_t^{RF}}] = eig^{N_t^{RF} - K}((V_{Oth})^H V_{Oth}) \quad (33)$$

The corresponding constant-magnitude analog beams are then given by:

$$v_{K+j}^{(RF)} = \exp\{j \arg(v_{K+j})\}, \text{ for } j=1,2,L,N_t^{RF} - K \quad (34)$$

The processor 100 utilizes the constant-magnitude analog beams to drive the transceiver 103 for beamforming.

Figure 9:
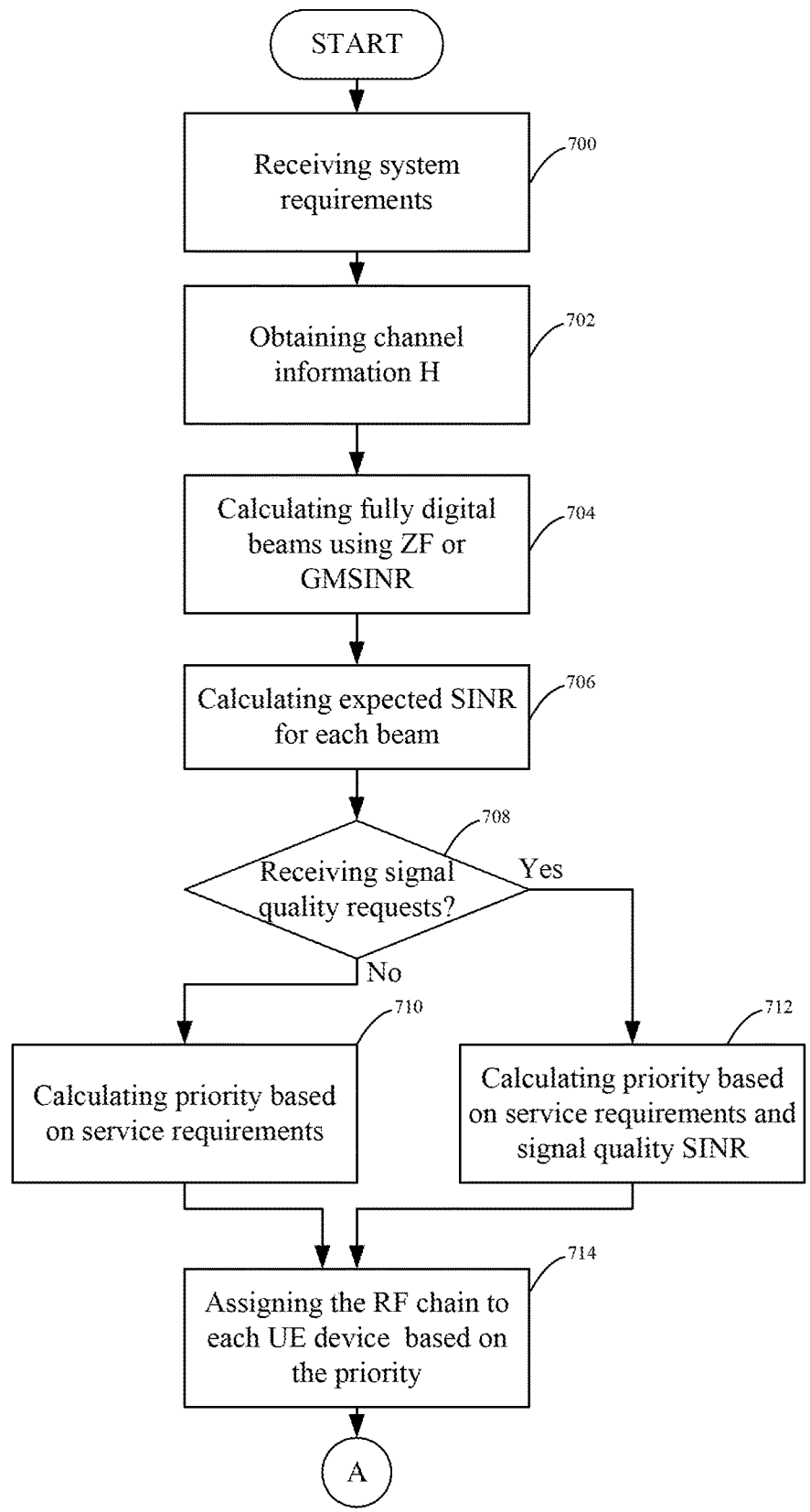
FIG. 9 shows a block diagram of an embodiment of a RF chain allocation method of the disclosure.

With reference to FIG. 9, the processor 100 drives the transceiver 103 to execute the proposed RF chain allocation methods.

The MIMO antenna array system of the BS 100 receives input signals and performs beamforming processing on the input signals. The processor 101 obtains a total number of RF chains 121 in the MIMO antenna array system of transceiver 103. The processor 101 obtains a total number of the data streams $S_1, S_2, \ldots S_K$ in the input signals for the UE identities. The processor 101 may receive system requirements, such as service requirements and signal requirements, associated with data streams $S_1, S_2, \ldots S_K$ for a plurality of user equipment identities (block 700). The processor 101 obtains channel information H associated with the BS 100 (block 702). The processor 101 calculates fully digital beams in stage 110 for the data streams $S_1, S_2, \ldots S_K$ such as using ZF or GMSINR (block 704), and calculates expected SINR for each beam output by the transceiver 103 (block 706). The processor 101 determines whether the BS 100 receives signal requirements associated with data streams $S_1, S_2, \ldots S_K$ for a plurality of user equipment identities (block 708). When the BS 100 does not receive the signal requirements, the processor 101 may prioritize the data streams $S_1, S_2, \ldots S_K$ and select a sub-group of the data streams from the data streams $S_1, S_2, \ldots S_K$ according to the service requirements (block 710). When the BS 100 receives the signal requirements, the processor 101 may prioritize the data streams $S_1, S_2, \ldots S_K$ and select a sub-group of the data streams from the data streams $S_1, S_2, \ldots S_K$ according to the service requirements and the signal requirements (block 712). The processor 101 performs the RF chain allocation method (block 714).

In the block 714, the processor 101 allocates each of the RF chains 121 to a selected sub-group of the data streams $S_1, S_2, \ldots S_K$ for beamforming processing to achieve a first injective and surjective allocation relationship between the RF chains 121 and the data streams $S_1, S_2, \ldots S_K$ when the number of the RF chains 121 is less than or equal to the total number of the data streams $S_1, S_2, \ldots S_K$. The selected sub-group of the data streams includes a subset of the data streams $S_1, S_2, \ldots S_K$ which is selected from the data streams $S_1, S_2, \ldots S_K$ according to priority between the data streams $S_1, S_2, \ldots S_K$. The processor 101 determines the priority between the data streams $S_i, S_2, \ldots S_K$ is based on at least one requirement of the service requirements and the signal requirements. The signal requirements are measured based on group signal to interference plus noise ratio (SINR) associated with the data streams. The RF chain allocation method has two cases depending on whether the decomposition design or the orthogonal space design is used.

Figure 10:
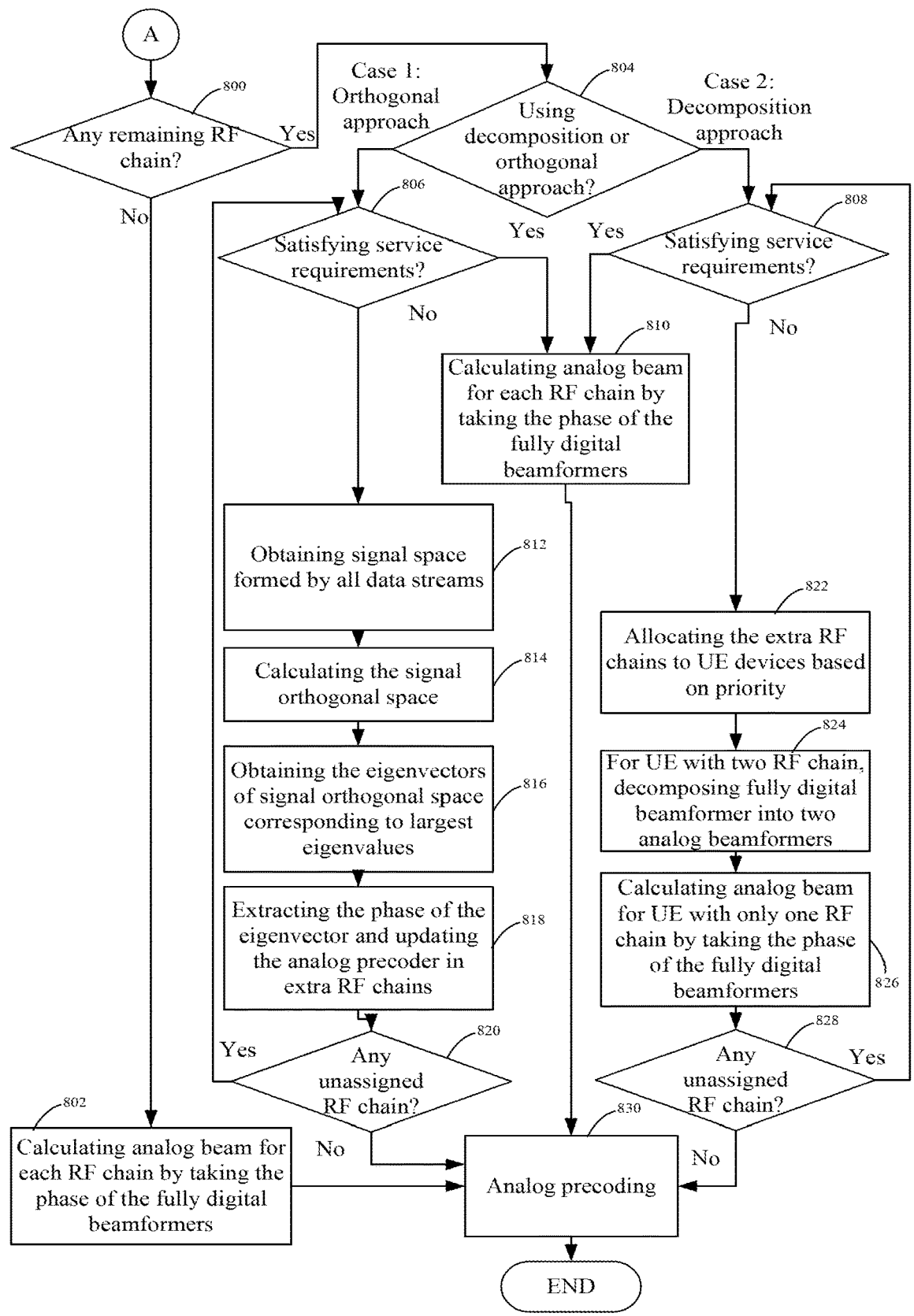
FIG. 10 shows a block diagram of an embodiment of a RF chain allocation method of the disclosure.

With reference to FIG. 10, the processor 101 determines whether the transceiver 103 has any extra RF chain (block 800). When the transceiver 103 does not have any extra RF chain not yet allocated, the processor 101 obtains beam parameters of analog precoders (beamformers) for the allocated RF chains by taking the phases of the fully digital beams output by the digital precoder stage 110 (block 802). The analog precoders obtained includes phase parameters of phase shifters 131 in stage 130. The processor 101 may compute the phases of the fully digital beams using the zero-forcing (ZF) criterion, the group maximum SINR filter bank (GMSINRFB) methods, or other methods. Amplitudes of the analog precoders may be set as constant. The processor 101 drives the phase shifters 131 in the stage 130 to perform analog precoding based on the obtained beam parameters (block 830).

When the transceiver 103 has one or more extra RF chains not yet allocated after the processing of the block 714, the processor 101 allocates each of the extra RF chains to one data stream according to the priority obtained until no more extra RF chain remained.

The processor 101 determines whether to use a decomposition approach or an orthogonal approach (block 804). When using the orthogonal approach, the processor 1 determines whether the RF allocation in the BS 100 satisfies the service requirements (block 806)? If the RF allocation in the BS 100 satisfies the service requirements, the processor 101 obtains beam parameters of analog precoders (beamformers) for the allocated RF chains by taking the phases of the fully digital beams output by the digital precoder stage 110 (block 810). The processor 101 drives the phase shifters 131 in the stage 130 to perform analog precoding based on the obtained beam parameters (block 830).

If the RF allocation in the BS 100 does not satisfies the service requirements, the processor 101 obtains signal space formed by channels of all data streams (block 812) and calculates orthogonal space of the obtained signal space (block 814). The processor obtains and sorts eigenvectors of the orthogonal space according to corresponding eigenvalues associated with the eigenvectors, from the largest to the smallest (block 816).

The SINRs of all data streams are computed. The processor 101 obtains a joint performance measurement from weighted SINRs and the service requirements of the data streams. The processor 101 repeats the same procedure each time using one of the eigenvectors not yet assigned with an RF chain. The processor 101 selects an eigenvector which results in the largest increase of the joint performance measurement to be assigned with an extra RF chain. The processor 101 extracts the phase of the selected eigenvector as beam parameters of analog precoder in stage 130 for the assigned extra RF chain, with the amplitudes of the analog precoders kept constant, and updates the analog precoder in stage 130 for the assigned extra RF chain (block 818). With reference to FIG. 8, for example, the processor 101 adjusts the analog precoder associated with the assigned extra RF chain in a second subset 124 of the RF chains to suppress inter-beam interference between beams 200 generated from output of the beamforming processing. The processor 101 obtains phase shifter parameters representing phases of the analog precoders in the analog beamforming stage 130 of the MIMO antenna array system and obtains orthogonal space of the phase shifter parameters. The processor 101 allocates the extra RF chain to form beams pointing to the direction of the first orthogonal component. The first orthogonal component is a component in the orthogonal space associated with analog precoders in an analog beamforming stage 130 of the BS 100.

It is also possible to decompose the selected eigenvector into two constant-amplitude analog precoders using the decomposition method. The processor 101 may allocate the decomposed constant-amplitude analog precoders to two extra RF chains, and utilize beam parameters of the decomposed constant-amplitude analog precoders to update the decomposed constant-amplitude analog precoders.

The processor 101 determines whether any extra RF chain remains (block 820). If no not yet allocated extra RF chain remains, the processor executes block 830. If at least one extra RF chain remains, the processor executes block 806 and computes a orthogonal signal space which is orthogonal to the signal space spanned by the beams of the RF chains already assigned. Bocks 806-820 are executed repeatedly until no extra RF chain remains not yet allocated.

When using the decomposition approach, the processor 1 determines whether the RF allocation in the BS 100 satisfies the service requirements (block 808)? If the RF allocation in the BS 100 satisfies the service requirements, the processor 101 obtains beam parameters of analog precoders (beamformers) for the allocated RF chains by taking the phases of the fully digital beams output by the digital precoder stage 110 (block 810).

In block 714, the processor 101 may allocate a first subset of the RF chains 121 to the data streams $S_1, S_2, \ldots S_K$ for beamforming processing to achieve a second injective and surjective allocation relationship between the RF chains 121 and the data streams $S_1, S_2, \ldots S_K$ when the number of the RF chains 121 is greater than the total number K of the data streams $S_1, S_2, \ldots S_K$. After each data stream has been allocated one RF chain, if still one or more RF chains remain not yet allocated, the processor 101 may allocate one of the extra RF chain to one data stream according to the priority obtained. The processor 101 selects and allocates an RF chain in the first subset of the RF chains 121 and an extra RF chain in a second subset of the RF chains 121 to one selected data stream in the data streams S1, S2, SK (block 822).

The processor 101 utilizes a first analog precoder associated with the selected RF chain in the first subset and a second analog precoder associated with the extra RF chain in the second subset to perform beam decomposition.

With reference to FIG. 7, the processor 101 may allocate a first subset 123 of the RF chains 121 to the data streams $S_1, S_2, \ldots S_K$ for beamforming processing to achieve a second injective and surjective allocation relationship between the RF chains 121 and the data streams $S_1, S_2, \ldots S_K$ when the number of the RF chains 121 is greater than the total number K of the data streams $S_1, S_2, \ldots S_K$. After each data stream has been allocated one RF chain, if still the (K+1)-th RF chains remain in the subset 124 not yet allocated, the processor 101 may allocate the (K+1)-th RF chain to the K-th data stream according to the priority obtained. The processor 101 selects and allocates the K-th RF chain in the first subset 123 of the RF chains 121 and the (K+1)-th RF chain in a second subset 124 of the RF chains 121 to the K-th data stream in the data streams S1, S2, . . . SK.

For a data stream allocated with two RF chains, the processor 101 obtains beam parameters of the analog precoders for the two RF chains by first computing the fully digital beamformer for the data stream, then decompose the fully digital beamformer into two constant amplitude beams (block 824). For a data stream allocated with only one RF chain, the processor 101 obtains the analog precoder of the data stream by taking the phases of the fully digital beamformer for the data stream, with the amplitudes kept constant (block 826).

With reference to FIG. 7, for example, the processor 101 obtains beam parameters, such as $v_i^{(Fully)}$, representing phases of the i-th digital precoder and obtains two decomposed components, such as $v_{i1}^{(RF)}$ and $v_{i2}^{(RF)}$, of the beam parameters representing phases of the i-th digital precoder. The processor 101 utilizes a first decomposed component, such as $v_{i1}^{(RF)}$, in the two decomposed components to update the K-th analog precoder and utilizes a second decomposed component, such as $v_{i2}^{(RF)}$, in the two decomposed components to update the (K+1)-th analog precoder.

The processor 101 allocates the K-th analog precoder associated with the selected RF chain in the first subset 123 and the (K+1)-th analog precoder associated with the extra RF chain in the second subset 124 to form beams.

The processor 101 determines whether any extra RF chain remains (block 828). If no unassigned extra RF chain remains, the processor executes block 830. If at least one extra RF chain remains, the processor repeats Bocks 808-828 until no extra RF chain remains unassigned.

The RF allocation method is utilized in a massive multiple-input multiple-output (MIMO) system. Specifically, a hybrid beamforming (HB) system in which the overall beamformer consists of a low-dimensional digital beamformer followed by an analog beamformer utilized the method to allocate RF chains to data streams and perform beamforming processing. The total number of RF chains is not necessarily equal to the number of data streams to users. An extra RF chain may be allocated to a data stream using an orthogonal space approach or a beam decomposition approach.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A radio frequency (RF) chain allocation method executable by a radio node device comprising:
   receiving service requirements associated with a plurality of user equipment identities;
   obtaining a total number of RF chains in a multiple-input and multiple-output (MIMO) antenna array system, wherein the MIMO antenna array system receives and performs beamforming processing on input signals;
   obtaining a total number of data streams in the input signals for the plurality of user equipment identities;
   determining whether the total number of the RF chains is less than or equal to the total number of the data streams, wherein
   if the total number of the RF chains is determined to be less than or equal to the total number of the data streams, allocating the RF chains to a selected group of the data streams for beamforming processing to achieve an injective allocation relationship between the RF chains and the data streams, wherein the selected group of the data streams includes a subset of the data streams which is selected from the data streams according to the service requirements; and
   if the total number of the RF chains is determined not to be less than or equal to the total number of the data streams, allocating a first subset of the RF chains to the data streams for beamforming processing to achieve a surjective allocation relationship between the RF chains and the data streams, wherein a selected RF chain in the first subset of the RF chains and an extra RF chain in a second subset of the RF chains are allocated to one selected data stream in the data streams, utilizing a first analog precoder associated with the selected RF chain in the first subset and a second analog precoder associated with the extra RF chain in the second subset to perform beam decomposition, and allocating the first analog precoder associated with the selected RF chain in the first subset and the second analog precoder associated with the extra RF chain in the second subset to form beams; wherein the total number of the RF chains is determined not to be less than or equal to the total number of the data streams at least once.

2. The method of claim 1 further comprising:
   if the total number of the RF chains is determined not to be less than or equal to the total number of the data streams, obtaining beam parameters representing phases of a first digital precoder,
   obtaining two decomposed components of the beam parameters representing phases of the first digital precoder,
   utilizing a first decomposed component in the two decomposed components to update the first analog precoder, and
   utilizing a second decomposed component in the two decomposed components to update the second analog precoder.

3. The method of claim 1 further comprising:
   receiving signal requirements associated with data streams for the plurality of user equipment identities, wherein the subset of the data streams is selected from the data streams according to the service requirements and the signal requirements.

4. The method of claim 3, wherein the signal requirements are measured based on group signal to interference plus noise ratio associated with the data streams.

5. A radio node device comprising:
   a multiple-input and multiple-output (MIMO) antenna array system;
   a processor; and
   a memory for storing at least one computer program, wherein the computer program comprises instructions which are executed by the processor, and performs the following steps:
   receiving service requirements associated with a plurality of user equipment identities;
   obtaining a total number of RF chains in the MIMO antenna array system, wherein the MIMO antenna array system receives and performs beamforming processing on input signals;
   obtaining a total number of data streams in the input signals for the plurality of user equipment identities;
   allocating the RF chains to a selected group of the data streams for beamforming processing to achieve an injective allocation relationship between the RF chains and the data streams when the number of the RF chains is less than or equal to the total number of the data streams, wherein the selected group of the data streams includes a subset of the data streams which is selected from the data streams according to the service requirements;
   allocating a first subset of the RF chains to the data streams for beamforming processing to achieve a surjective allocation relationship between the RF chains and the data streams when the number of the RF chains is greater than the total number of the data streams, wherein a selected RF chain in the first subset of the RF chains and an extra RF chain in a second subset of the RF chains are allocated to one selected data stream in the data streams;
   utilizing a first analog precoder associated with the selected RF chain in the first subset and a second analog precoder associated with the extra RF chain in the second subset to perform beam decomposition; and
   allocating the first analog precoder associated with the selected RF chain in the first subset and the second analog precoder associated with the extra RF chain in the second subset to form beams.

6. The device of claim 5, wherein the steps further comprise:

obtaining beam parameters representing phases of a first digital precoder;

obtaining two decomposed components of the beam parameters representing phases of the first digital precoder;

utilizing a first decomposed component in the two decomposed components to update the first analog precoder; and utilizing a second decomposed component in the two decomposed components to update the second analog precoder.

7. The device of claim 5, wherein the steps further comprise:

receiving signal requirements associated with data streams for the plurality of user equipment identities, wherein the subset of the data streams is selected from the data streams according to the service requirements and the signal requirements.

8. The device of claim 7, wherein the signal requirements are measured based on group signal to interference plus noise ratio associated with the data streams.

\* \* \* \* \*